US012291919B1

(12) United States Patent
Maas et al.

(10) Patent No.: US 12,291,919 B1
(45) Date of Patent: May 6, 2025

(54) INJECT CLIP FOR FENESTRATION FRAMES AND METHODS

(71) Applicant: ANDERSEN CORPORATION, Bayport, MN (US)

(72) Inventors: Andrew Maas, St. Paul, MN (US); Austin Gould, Minneapolis, MN (US); Clinton Dehne, River Falls, WI (US); Jeremy Tolzman, Somerset, WI (US)

(73) Assignee: Andersen Corporation, Bayport, MN (US)

( * ) Notice: Subject to any disclaimer, the term of this patent is extended or adjusted under 35 U.S.C. 154(b) by 61 days.

(21) Appl. No.: 18/071,792

(22) Filed: Nov. 30, 2022

Related U.S. Application Data

(60) Provisional application No. 63/285,625, filed on Dec. 3, 2021.

(51) Int. Cl.
*E06B 3/968* (2006.01)
*E06B 1/58* (2006.01)

(52) U.S. Cl.
CPC ................ *E06B 1/58* (2013.01); *E06B 3/968* (2013.01)

(58) Field of Classification Search
CPC .......... E06B 1/58; E06B 3/968; E06B 3/9681; E06B 3/9682; E06B 3/9616; E06B 3/962; E06B 3/9645
See application file for complete search history.

(56) References Cited

U.S. PATENT DOCUMENTS

| | | | | |
|---|---|---|---|---|
| 4,097,320 | A * | 6/1978 | Brauer | E06B 3/667 428/34 |
| 4,453,855 | A * | 6/1984 | Richter | E06B 3/667 403/402 |
| 4,651,482 | A * | 3/1987 | Borys | E06B 3/667 403/295 |
| 5,494,370 | A * | 2/1996 | Habicht | E06B 3/9642 403/231 |
| 5,498,099 | A * | 3/1996 | Scheuer | E06B 3/9682 403/402 |
| 6,746,175 | B1 * | 6/2004 | Gonnerman | E06B 3/962 403/403 |
| 7,073,292 | B1 * | 7/2006 | Minter | E05B 65/0876 49/446 |
| 10,378,569 | B2 * | 8/2019 | Jensen | F16B 11/006 |
| 2001/0014250 | A1 * | 8/2001 | Plummer | B29C 66/1162 403/295 |
| 2003/0059253 | A1 * | 3/2003 | Trpkovski | E06B 3/667 403/294 |

(Continued)

FOREIGN PATENT DOCUMENTS

| | | | |
|---|---|---|---|
| CN | 203223123 | U * | 10/2013 |
| CN | 203584223 | U * | 5/2014 |

(Continued)

*Primary Examiner* — Kyle J. Walraed-Sullivan
(74) *Attorney, Agent, or Firm* — Mueting Raasch Group

(57) ABSTRACT

Fenestration unit frames with intermediate jambs including one or more inject clips at junctions between the intermediate jambs and frame members and methods of making the same are described herein. Sealing junctions between intermediate jambs and the frame members of fenestration unit frames to limit or prevent air and/or water infiltration can be difficult due to, e.g., manufacturing tolerances and clearances needed to facilitate assembly of the fenestration unit frames.

16 Claims, 6 Drawing Sheets

(56) References Cited

U.S. PATENT DOCUMENTS

| | | | | |
|---|---|---|---|---|
| 2005/0223661 | A1* | 10/2005 | Hetherington | E06B 3/9641 52/204.1 |
| 2006/0248803 | A1* | 11/2006 | Kirk | E06B 3/9642 49/458 |
| 2008/0034702 | A1* | 2/2008 | Garries | E06B 3/968 52/656.2 |
| 2009/0165406 | A1* | 7/2009 | Campbell | E06B 7/14 52/211 |
| 2009/0277111 | A1* | 11/2009 | Albrecht | E06B 3/08 29/897 |
| 2013/0051902 | A1* | 2/2013 | Kelley | B29C 66/636 403/205 |
| 2013/0111847 | A1* | 5/2013 | Emanuel | E06B 3/22 52/656.9 |
| 2021/0010320 | A1* | 1/2021 | Belau | E06B 3/9612 |
| 2023/0134444 | A1* | 5/2023 | Meyer | E06B 3/9641 52/209 |
| 2023/0228988 | A1* | 7/2023 | Hatton | G02F 1/1679 359/227 |
| 2023/0295980 | A1* | 9/2023 | Steademan | E06B 3/962 52/656.9 |

FOREIGN PATENT DOCUMENTS

| | | | | |
|---|---|---|---|---|
| CN | 106499305 | A * | 3/2017 | |
| DE | 101 17 424 | A1 | 11/2002 | |
| EP | 2055885 | A2 * | 5/2009 | E06B 3/9632 |

* cited by examiner

INJECT CLIP FOR FENESTRATION FRAMES AND METHODS

RELATED APPLICATION

This application claims the benefit under 35 U.S.C. § 119 of U.S. Provisional Application Ser. No. 63/285,625, filed 3 Dec. 2021, and titled INJECT CLIP FOR FENESTRATION FRAMES AND METHODS, which is incorporated herein by reference in its entirety.

FIELD

Fenestration unit frames with intermediate jambs including one or more inject clips at junctions between the intermediate jambs and frame members and methods of making the same are described herein.

BACKGROUND

Fenestration unit frames used in a variety of fenestration units may include an intermediate jamb such that two or more windows, doors, etc. may be provided in a single unitary frame. Sealing the junction between the intermediate jambs and the frame members to which they are connected can be challenging.

SUMMARY

Fenestration unit frames with intermediate jambs including one or more inject clips at junctions between the intermediate jambs and frame members and methods of making the same are described herein.

Sealing junctions between intermediate jambs and the frame members of fenestration unit frames to limit or prevent air and/or water infiltration can be difficult due to, e.g., manufacturing tolerances and clearances needed to facilitate assembly of the fenestration unit frames.

Although flowable sealants can be used to seal gaps formed at the junctions between the intermediate jambs and the frame members, the application of flowable sealants to such gaps can result in incomplete sealing of the gaps, even in instances where an excessive amount of the flowable sealant is applied to the seal the gaps.

The inject clips used at junctions between the intermediate jambs and the frame members of fenestration unit frames described herein control the flow of the flowable sealants at the junctions to provide controlled delivery of the flowable sealant across and into gaps found at the junctions.

In one or more embodiments, the inject clips define one or more cavities that, upon the introduction of flowable sealant, provide back pressure that promotes the flow of the flowable sealant into and across the gaps found at the junctions.

In one or more embodiments, the inject clips include one or more fill vents to provide visual feedback indicating sufficient filling of the chambers in the injection clips that corresponds to adequate sealing of the gaps found at the junctions.

In one or more embodiments, the inject clips include one or more features that interlock with one or more features on the intermediate jamb and/or frame member to fix the position of the injection clips during the delivery of flowable sealant. In one or more embodiments, the inject clips may be fixed in place using one or more mechanical fasteners alone or in combination with such interlocking features.

In a first aspect, one or more embodiments of a fenestration unit frame as described herein include: a plurality of frame members attached to each other to define a perimeter of a fenestration unit frame; an intermediate jamb extending between a pair of frame members on opposite sides of the fenestration unit frame, the intermediate jamb extending from a first end to a second end, wherein the first end abuts a first frame member of the pair of frame members at a first junction located at an intermediate location along a length of the first frame member and the second end abuts a second frame member of the pair of frame members at a second junction located at an intermediate location along a length of the second frame member; and an inject clip proximate the first junction, the inject clip comprising: a base configured for placement on a jamb surface of the intermediate jamb adjacent the first frame member, wherein the base defines a base cavity located between the jamb surface and the base; an injection chamber attached to the base, the injection chamber extending away from base towards an end of the first frame member, the injection chamber comprising an injection port configured to receive flowable sealant into a chamber cavity of the injection chamber, wherein the chamber cavity is in fluid communication with the base cavity when the base of the inject clip is positioned on the jamb surface such that flowable sealant delivered to the chamber cavity through the injection port flows into the base cavity.

In one or more embodiments of a fenestration unit frame as described herein, the inject clip comprises a fill vent opening into the base cavity, the fill vent configured to provide an exit path out of the base cavity for a flowable sealant delivered into the base cavity through the injection port and the chamber cavity.

In one or more embodiments of a fenestration unit frame as described herein, the fill vent comprises a first fill vent and wherein the inject clip comprises a second fill vent opening into the base cavity, the second fill vent configured to provide an exit path out of the base cavity for a flowable sealant delivered into the base cavity through the injection port and the chamber cavity.

In one or more embodiments of a fenestration unit frame as described herein, the intermediate jamb comprises a clip cavity extending into the jamb surface and wherein the inject clip comprises a clip retainer extending away from the base cavity into the clip cavity, wherein the clip cavity and the clip retainer mechanically interlock with each other to limit movement of the inject clip in a direction transverse to an intermediate jamb axis extending through the first end and the second end of the intermediate jamb.

In one or more embodiments of a fenestration unit frame as described herein, the intermediate jamb comprises a channel extending into the jamb surface and wherein the inject clip comprises a rib extending away from the base cavity into the channel, wherein the channel and the rib mechanically interlock with each other to limit movement of the inject clip in a direction transverse to an intermediate jamb axis extending through the first end and the second end of the intermediate jamb.

In one or more embodiments of a fenestration unit frame as described herein, the injection chamber defines a slot configured to receive a portion of the first frame member, wherein the slot and the portion of the first frame member mechanically interlock with each other to limit movement of the inject clip in a direction aligned with an intermediate jamb axis extending through the first end and the second end of the intermediate jamb. In one or more embodiments, the portion of the first frame member and the slot form and interference fit configured to maintain a position of the inject clip along a length of the first frame member.

In one or more embodiments of a fenestration unit frame as described herein, the intermediate jamb comprises a clip cavity extending into the jamb surface and wherein the inject clip comprises a clip retainer extending away from the base cavity into the clip cavity, wherein the clip cavity and the clip retainer mechanically interlock with each other to limit movement of the inject clip in a direction transverse to an intermediate jamb axis extending through the first end and the second end of the intermediate jamb; and the injection chamber defines a slot configured to receive a portion of the first frame member, wherein the slot and the portion of the first frame member mechanically interlock with each other to limit movement of the inject clip in a direction aligned with an intermediate jamb axis extending through the first end and the second end of the intermediate jamb. In one or more embodiments, the inject clip comprises a fill vent opening into the base cavity, the fill vent configured to provide an exit path out of the base cavity for a flowable sealant delivered into the base cavity through the injection port and injection chamber.

In one or more embodiments of a fenestration unit frame as described herein, the intermediate jamb comprises a channel extending into the jamb surface and wherein the inject clip comprises a rib extending away from the base cavity into the channel, wherein the channel and the rib mechanically interlock with each other to limit movement of the inject clip in a direction transverse to an intermediate jamb axis extending through the first end and the second end of the intermediate jamb; and the injection chamber defines a slot configured to receive a portion of the first frame member, wherein the slot and the portion of the first frame member mechanically interlock with each other to limit movement of the inject clip in a direction aligned with an intermediate jamb axis extending through the first end and the second end of the intermediate jamb. In one or more embodiments, the inject clip comprises a fill vent opening into the base cavity, the fill vent configured to provide an exit path out of the base cavity for a flowable sealant delivered into the base cavity through the injection port and injection chamber.

In a second aspect, one or more embodiments of a method of sealing a junction in a fenestration unit frame as described herein includes: placing an inject clip proximate a junction between a frame member and an intermediate jamb in a fenestration unit frame, wherein the intermediate jamb extends between a pair of frame members on opposite sides of the fenestration unit frame, the intermediate jamb extending from a first end to a second end, wherein the first end abuts a first frame member of the pair of frame members at a first junction located at an intermediate location along a length of the first frame member and the second end abuts a second frame member of the pair of frame members at a second junction located at an intermediate location along a length of the second frame member; and injecting flowable sealant into a chamber cavity of the inject clip, wherein the flowable sealant flows from the chamber cavity into a base cavity formed between a base of the inject clip and a jamb surface of the intermediate jamb adjacent the first frame member, wherein the base defines a base cavity located between the jamb surface and the base.

In one or more embodiments of a method of sealing a junction in a fenestration unit frame as described herein, the inject clip comprises a fill vent opening into the base cavity, and wherein injecting flowable sealant into the injection chamber comprises injecting flowable sealant into the chamber cavity until the flowable sealant exits the base cavity through the fill vent. In one or more embodiments, placing the inject clip proximate the junction between the frame member and the intermediate jamb comprises fixing a position of the inject clip on the frame surface of the intermediate jamb. In one or more embodiments, fixing the position of the inject clip comprises limiting movement of the inject clip in a direction transverse to an intermediate jamb axis extending through the first end and the second end of the intermediate jamb. In one or more embodiments, fixing the position of the inject clip comprises limiting movement of the inject clip in a direction aligned with the intermediate jamb axis extending through the first end and the second end of the intermediate jamb.

In one or more embodiments of a method of sealing a junction in a fenestration unit frame as described herein, fixing the position of the inject clip comprises inserting a clip retainer on the inject clip into a clip cavity extending into the jamb surface.

In one or more embodiments of a method of sealing a junction in a fenestration unit frame as described herein, fixing the position of the inject clip comprises inserting a rib on the inject clip into a channel extending into the jamb surface.

In one or more embodiments of a method of sealing a junction in a fenestration unit frame as described herein, fixing the position of the inject clip comprises positioning a portion of the first frame member into a slot formed in the injection chamber of the inject clip, wherein the slot and the portion of the first frame member limit movement of the inject clip in a direction aligned with an intermediate jamb axis extending through the first end and the second end of the intermediate jamb.

In one or more embodiments of a method of sealing a junction in a fenestration unit frame as described herein, fixing the position of the inject clip comprises inserting a mechanical fastener through the inject clip and into one or both of the intermediate jamb and the first frame member.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other when fenestration units are properly installed in a building opening.

Where used herein, the terms "exterior" and "interior" are used in a relative sense, e.g., an exterior edge and an interior edge of a sill or any other component describe edges located on opposite sides of the fenestration unit. In other words, an exterior edge could be found within the interior of a building or other structure that would conventionally define an interior and an exterior, while an interior edge could be found outside of a building or other structure that would conventionally define an interior and an exterior.

The above summary is not intended to describe each embodiment or every implementation of the fenestration unit frames with inject clips and methods of using the same described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 2:
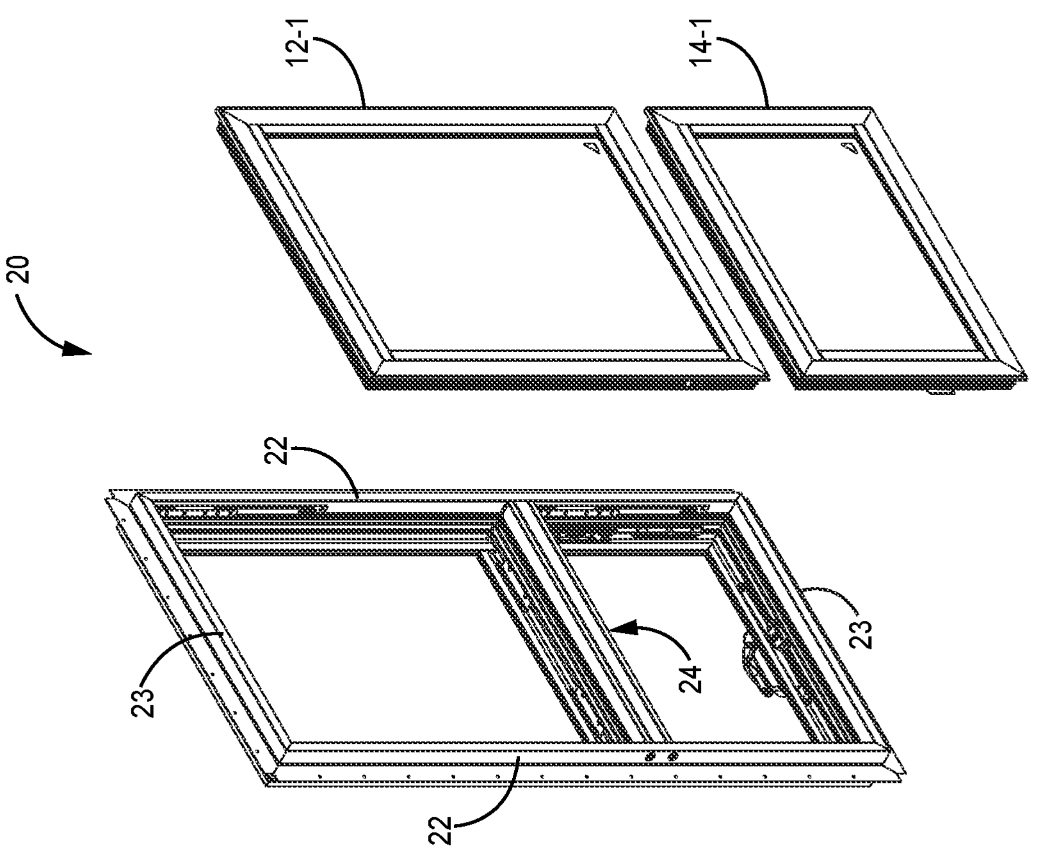
FIG. 2 is an exploded view of the fenestration unit of FIG. 1 in which the picture window sash and the awning window sash are separated from the fenestration unit frame.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Figure 1:
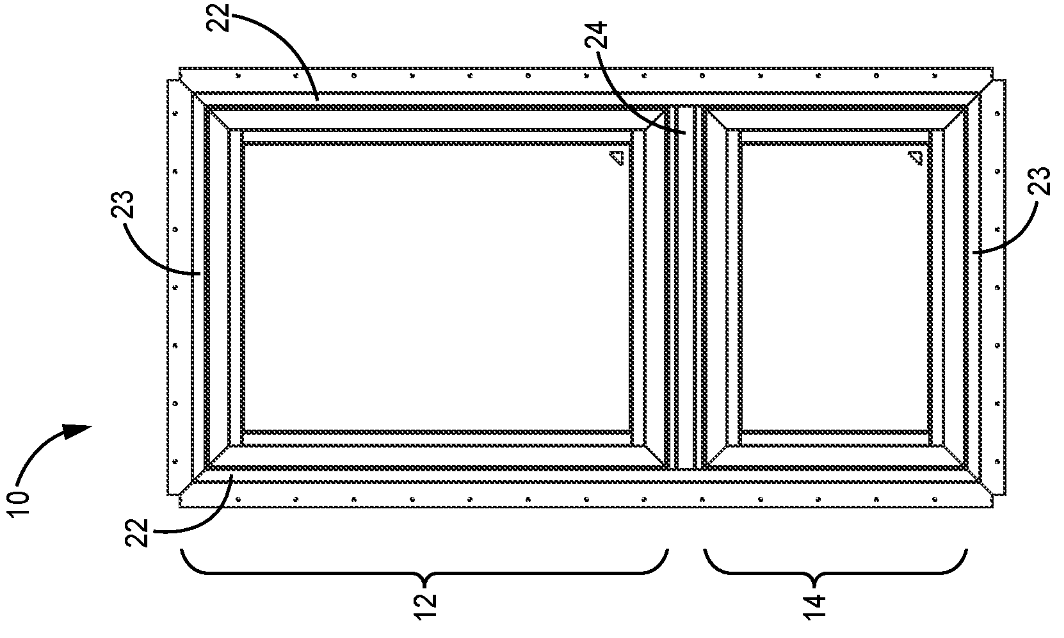
FIG. 1 depicts one illustrative embodiment of a fenestration unit in the form of a picture window over an awning window, with the picture and awning windows separated by an intermediate jamb extending across the fenestration unit frame.

One illustrative embodiment of a fenestration unit 10 including an intermediate jamb 24 is depicted in FIGS. 1-2. The fenestration unit 10 includes a picture window 12 over an awning window 14. The fenestration unit 10 is bounded by a fenestration unit frame that includes frame members 22 extending along the sides of the fenestration unit 10 between a top/head and bottom/sill frame members 23. The intermediate jamb 24 in the depicted illustrative embodiment of fenestration unit 10 is located between the picture window 12 and the awning window 14 and extending between the frame members 22 of the fenestration unit frame. With reference to FIG. 2, the picture window sash 12-1 and the awning window sash 14-1 are removed from the fenestration unit frame to expose the intermediate jamb 24 extending between the frame members 22.

Although the depicted embodiment of fenestration unit 10 includes a single intermediate jamb positioned between two window units, one or more alternative embodiments of fenestration units with which the inject clips described herein can be used may include two or more intermediate jambs. Further, although the depicted fenestration unit includes an intermediate jamb between a picture window and an awning window, the intermediate jambs in fenestration unit frames as described herein may be positioned between any two window units, with those window units being the same or different types of windows, e.g., double hung, single hung, slider, glider, casement, etc.

Still further, although the intermediate jamb in the depicted fenestration unit extends horizontally (when the fenestration unit is installed in a building opening with the picture window located above the awning window), the intermediate jamb or jambs in one or more alternative embodiments of fenestration units including one or more intermediate jambs may be positioned vertically or in any other desired orientation when the fenestration units are installed in building openings.

Each of the corner joints of the fenestration unit frames described herein includes a pair of frame members 22 and 23 that meet at a corner where a corner joint is formed to connect the frame members. The frame members may, in one or more embodiments, be attached to each other at the corner joints by welding portions of each frame member to the opposing frame member in the corner joint. Potentially suitable examples of welding corner joints are described in, e.g., U.S. Pat. No. 5,603,585 (Bruchu et al.) although other welding techniques could potentially be used to form the corner joints of fenestration unit frames as described herein. Although welding may be used to form corner joints in one or more embodiments of fenestration unit frames and methods as described herein, any other suitable technique or combination of techniques may be used to form corner joints, e.g., one or more of welding, adhesives, mechanical fasteners, etc. may be used to form corner joints in fenestration frames that include an integral mull post (intermediate jamb) as described herein.

In one or more embodiments of the fenestration unit frames and methods described herein, the corner joints in the fenestration unit frames may or may not include a corner key that fits within either end of the frame members to assist with aligning and/or fastening the frame members together at the corner joints (see, e.g., U.S. Pat. No. 8,851,787 (Kelley et al.) which describes frames and methods in which corner keys are used in fenestration unit frames). Although corner keys may be used in one or more embodiments of fenestration unit frames and methods described herein, in one or more alternative embodiments, the connection between the frame members and their alignment relative to each other at the corner joints to form the desired fenestration unit frame may be achieved in the absence of corner keys.

The frame members and/or intermediate jambs used in the fenestration unit frames described herein may be manufactured by a variety of processes. It may, however, be preferred that the frame members and/or intermediate jambs be manufactured of an extruded material which may, in one or more embodiments, include fibers and a polymer, pultruded materials, etc. Examples of some potentially suitable constructions for frame members that include fibers and a polymer may include those described in, e.g., U.S. Pat. No. 5,585,155 (Heikkila et al.); U.S. Pat. No. 6,106,944 (Heikkila et al.); U.S. Pat. No. 6,210,792 Seethamraju et al.); U.S. Pat. No. 6,260,251 (Guhl); U.S. Pat. No. 6,280,667 (Koenig et al.); U.S. Pat. No. 6,342,172 (Finley); etc. Alternatively, the frame members and/or intermediate jambs could be made primarily of polymeric materials such as, e.g., vinyls, etc. and/or metals (e.g., aluminum, steel, etc.).

Figure 3:
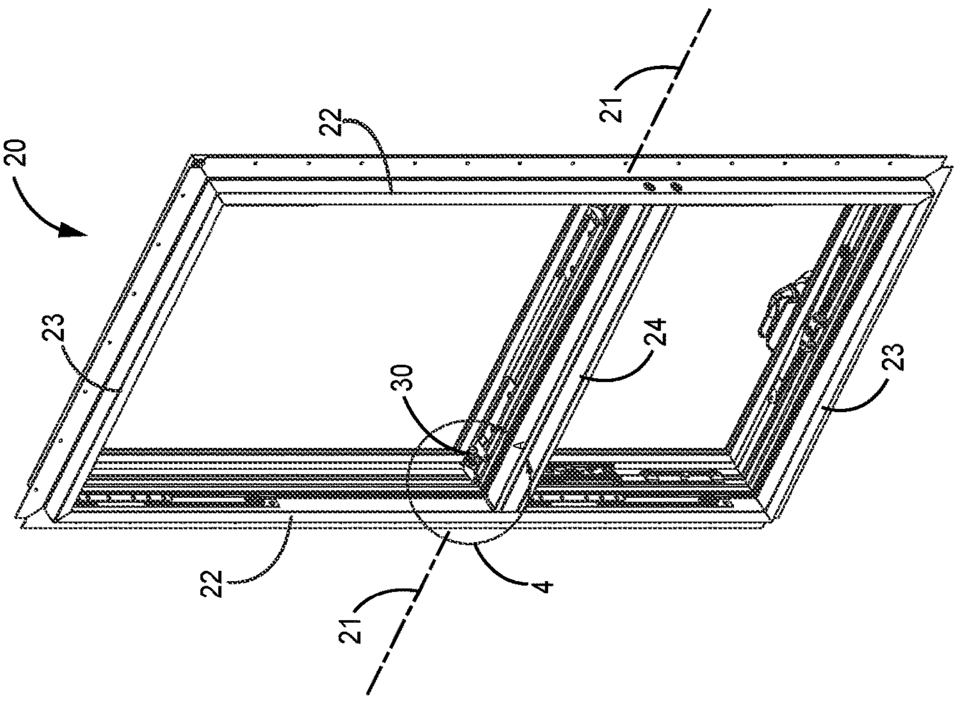
FIG. 3 is a right-side perspective view of the fenestration unit frame of FIG. 2.
Figure 4:
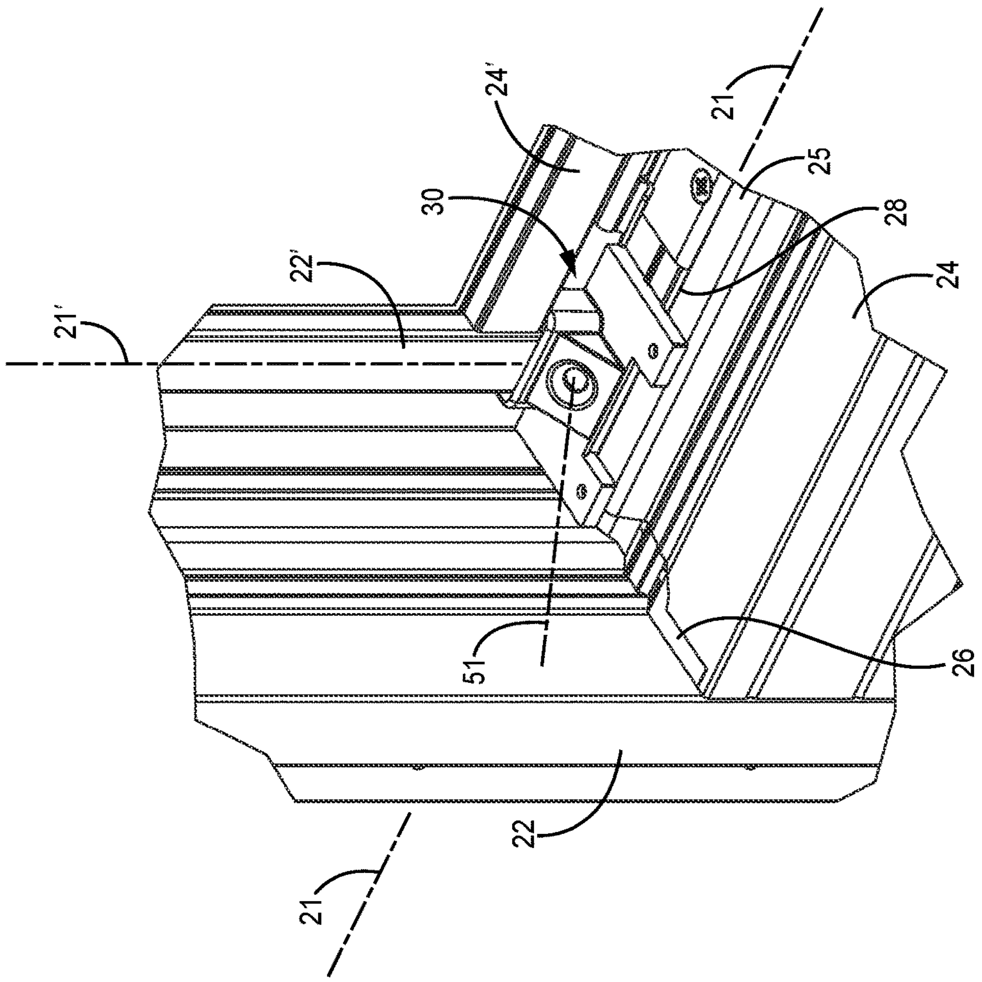
FIG. 4 is an enlarged view of one junction between the intermediate jamb and the left frame member of the fenestration unit frame as depicted in FIG. 3.

FIG. 3 is a right-side perspective view of the fenestration unit frame of FIG. 2 which is a left-side perspective view) and FIG. 4 is an enlarged view of left-side junction between the intermediate jamb 24 and the left-side frame member 22 of the fenestration unit frame as depicted in FIG. 3 to depict the positioning of one illustrative embodiment of an inject clip 30 at that junction. Although not depicted, the right-side junction between the intermediate jamb 24 and the right-side frame member 22 may also include an inject clip.

Figure 5:
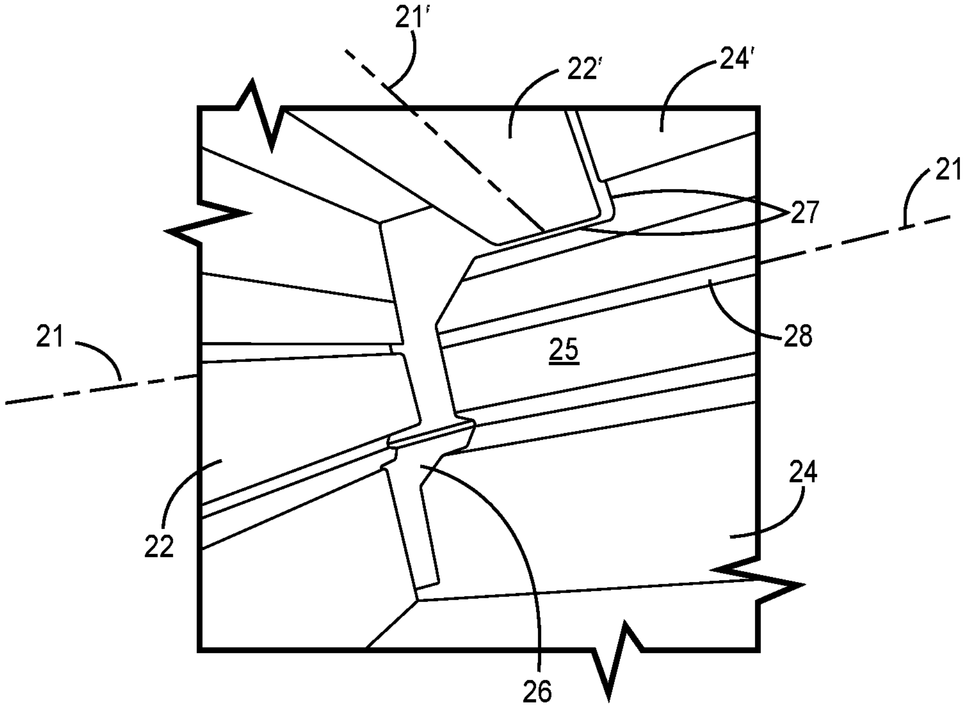
FIG. 5 depicts the junction of FIG. 4 without the inject clip.
Figure 6:
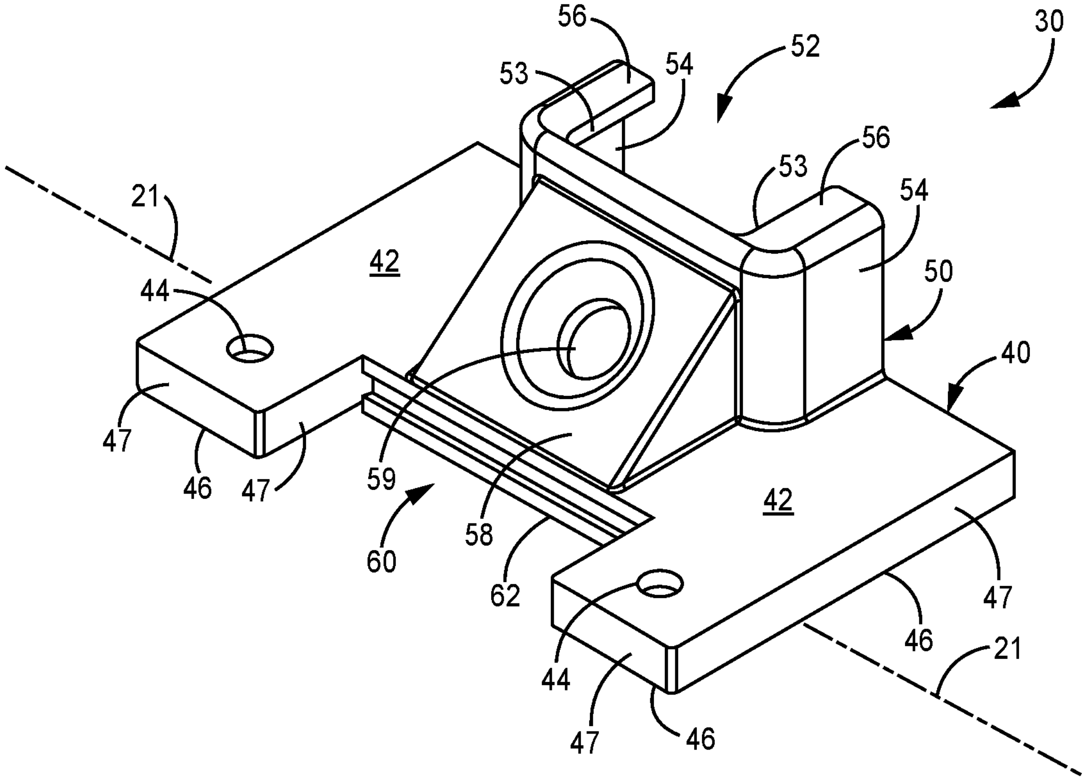
FIG. 6 is an enlarged perspective view of one illustrative embodiment of an inject clip as described herein.
Figure 7:
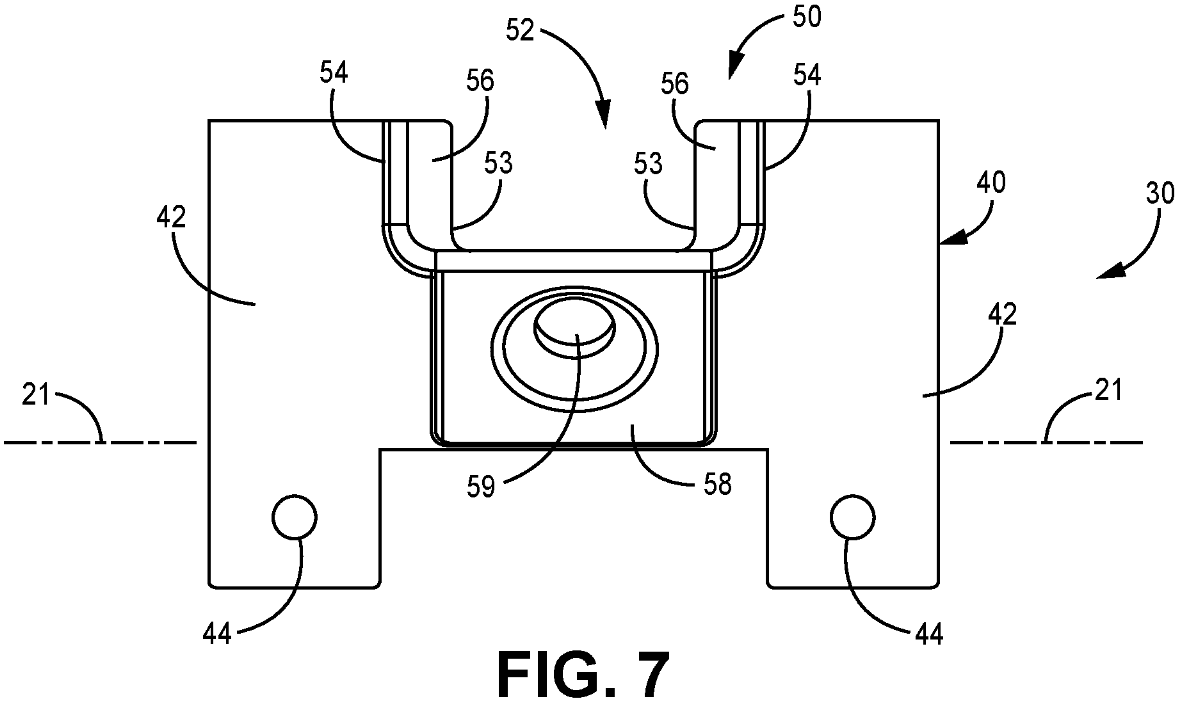
FIG. 7 is a top view of the inject clip of FIG. 6.
Figure 8:
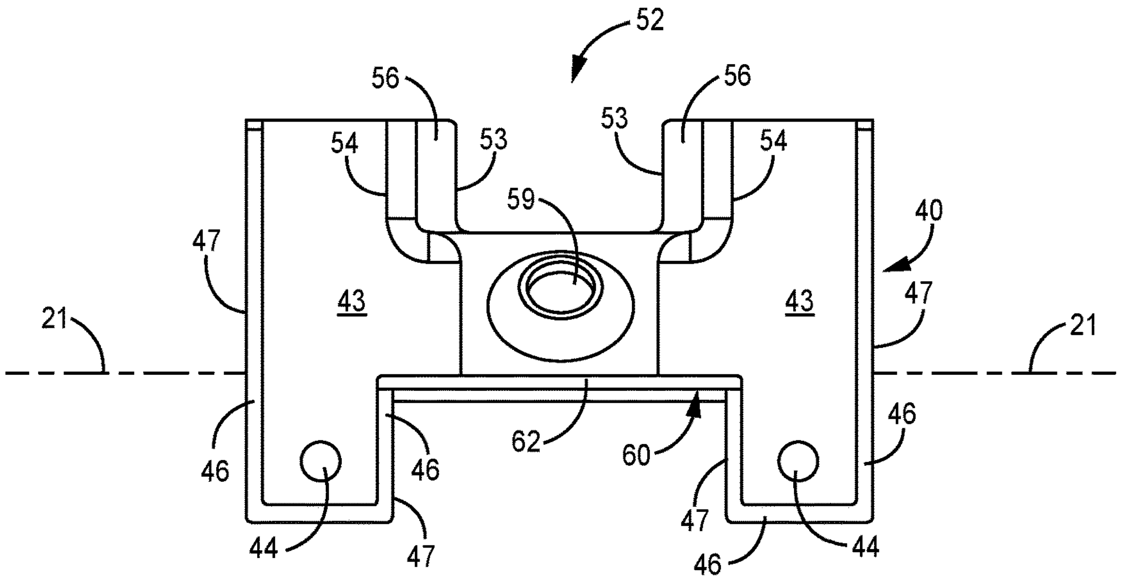
FIG. 8 is a bottom view of the inject clip of FIG. 6.
Figure 9:
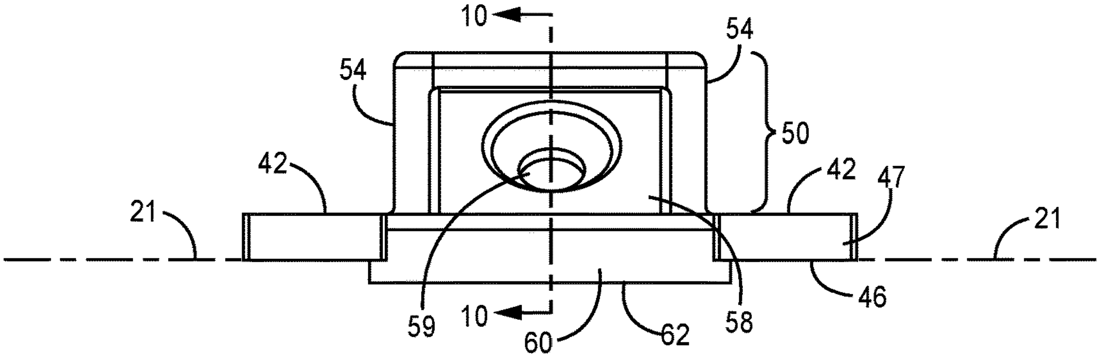
FIG. 9 is a front view of the inject clip of FIG. 6.
Figure 10:
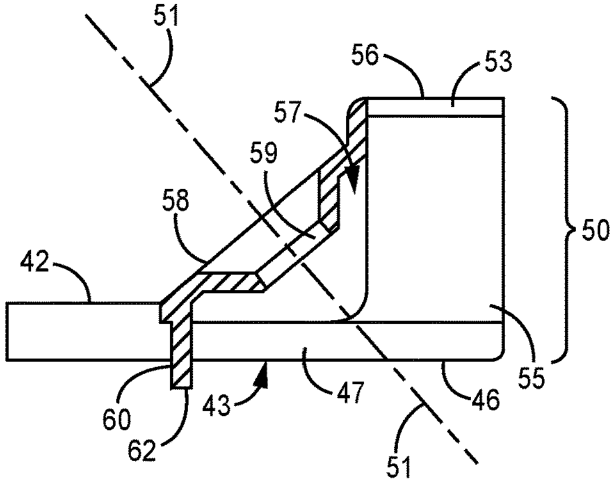
FIG. 10 is a cross-sectional view of the inject clip of FIG. 9 taken along line 10-10 in FIG. 9.

With reference to the enlarged views of FIGS. 4 and 5, the junction between the end of the intermediate jamb 24 and the frame member 22 is, in the depicted embodiment, at least partially sealed by a gasket 26. Although the gasket 26 seals a significant portion of the junction between the intermediate jamb 24 and frame member 22 a gap 27 (see FIG. 5) exists between the frame member 22 and intermediate jamb 24. Attempts to seal the gap 27 through the application of sealant in and around the gap 27 have been ineffective, wasteful of sealant material, and/or have not provided repeatable results.

Placement of an inject clip 30 at the junction between the end of the intermediate jamb 24 and the frame member 22 provides control over delivery of flowable sealant to the junction to seal gap 27 effectively, with a selected amount of flowable sealant, and in a manner that provides repeatable results.

The flowable sealant used in connection with the inject clips described herein include any flowable material that can be delivered into the cavities defined by the inject clips to seal gaps in the junctions between frame members and intermediate jambs. Examples of some potentially suitable flowable sealants may include, but are not limited to, methyl methacrylate sealants/adhesives, 1 component urethane sealants/adhesives, 2 component urethane sealants/adhesives, epoxy-based sealants/adhesives, hotmelt sealants/adhesives, 1- & 2-part acrylic sealants, MS polymer sealants/adhesives, silicone sealants/adhesives (including, e.g., structural silicone adhesives), etc.

In the depicted illustrative embodiment, the inject clip 30 is positioned on jamb surface 25 of the intermediate jamb 24 adjacent the frame member 22 at the junction depicted in FIGS. 4-5. Also in the depicted illustrative embodiment, frame member 22 includes a portion 22' that may be configured to provide a stop for the frame of a screen positioned on the opposite side of portion 22' while intermediate jamb 24 includes a portion 24' that may be configured to provide a stop for the frame of a screen positioned on the opposite side of portion 24'.

In the depicted embodiment, inject clip 30 is positioned at the junction between the jamb surface 25 of intermediate jamb 24 and portion 22' of the frame member 22 such that at least a portion of the inject clip 30 is located between portion 24' of intermediate jamb 24 and jamb surface 25 of intermediate jamb 24.

With reference to FIGS. 6-10, one illustrative embodiment of an inject clip 30 includes a base 40 configured for placement on the jamb surface 25 of the intermediate jamb 24 adjacent the frame member 22. The base 40 defines a base cavity 43 (see, e.g., FIGS. 8 and 10) that is located between the jamb surface 25 and the base 40 of the inject clip 30. Base cavity 43 is defined by the top surface 42 of the base 40 along with walls 47 terminating at edges 46 that position the top surface 42 of the base 40 above the jamb surface 25 of intermediate jamb 24 when inject clip 30 is positioned on jamb surface 25 with edges 46 of base 40 resting against the jamb surface 25.

The depicted illustrative embodiment of inject clip 30 also includes an injection chamber 50 attached to the base 40, with the injection chamber 50 extending away from the base 40 towards and end of the frame member 22 (in other words, along the length of the frame member 22 as it extends from the intermediate jamb 24 towards the top frame member 23 (see, e.g., FIG. 3).

The injection chamber 50 defines a chamber cavity 57 that is in fluid communication with the base cavity 43 of the base 40 when the base 40 of the inject clip 30 is positioned on the jamb surface 25 of intermediate jamb 24. The chamber cavity 57 of the injection chamber 50 is, like injection chamber 50 itself, located above the base cavity 43 defined by base 40 and jamb surface 25 of intermediate jamb 24. The chamber cavity 57 of injection chamber 50 is also defined, at least in part, by sidewalls 54 extending upward away from the base 40 along the length of the frame member 22, as well as caps 56 extending inward from sidewalls 54, with the caps 56 terminating in edges 53.

The sidewalls 54, caps 56, and edges 53 of the injection chamber 50 define a slot 52 that is, in the depicted embodiment, configured to receive portion 22' of frame member 22 as seen in, e.g., FIG. 4. When inject clip 30 is positioned on the jamb surface 25 of an intermediate jamb 24 such that portion 22' of frame member 22 is located within the slot 52 of injection chamber 50, the slot 52 and portion 22' of the frame member 22 mechanically interlock with each other to limit movement of the inject clip 30 in a direction aligned with the intermediate jamb axis 21 that extends through the ends of the intermediate jamb 24. In a preferred embodiment, the mechanical interlock between portion 22' of frame member 22 and slot 52 of injection chamber 50 of inject clip 30 prevents movement of the inject clip 30 along intermediate jamb axis 21.

In one or more embodiments, the width of slot 52 as measured between the edges 53 may be sized such that the portion 22' of frame member 20 and the slot 52 form an interference fit. In one or more embodiments, that interference fit is sufficient to maintain the position of the inject clip 30 along the length of frame member 22 (which extends along axis 21' as seen in FIGS. 4-5). In one or more embodiments, the length of the frame member 22 (and axis 21') may preferably be oriented transverse to the intermediate jamb 24 (and axis 21).

Flowable sealant delivered into the chamber cavity 57 of the injection chamber 50 when the inject clip 30 is positioned on a jamb surface such as jamb surface 25 (as seen in, e.g., FIG. 4) flows from the chamber cavity 57 of the injection chamber 50 into the base cavity 43 of the base 40. The flowable sealant also flows over and preferably into gap 27 formed between the intermediate jamb 24 and frame member 22, more particularly, the gap 27 formed between the intermediate jamb 24 and portion 22' of frame member 22 in the depicted illustrative embodiment.

The inject clip 30 also includes an injection port 59 configured to receive flowable sealant into the chamber cavity 57 of the injection chamber 50. In the depicted embodiment the injection port 59 is located in a face 58 of the injection chamber 50, with the face 58 being oriented at an angle with respect to the top surface 42 of base 40 as well as the sides 54 of injection chamber 50. The angular relationship between face 58/injection port 59 and the base 40 and injection chamber 50 may, in one or more embodiments, facilitate sealing of a gap 27 formed between intermediate jamb 24 and the frame member 22 by delivering flowable sealant into the chamber cavity 57 along a delivery axis 51 that extends into or proximate the gap 27 between intermediate jamb 24 and frame member 22 (and see, e.g., FIGS. 4 and 10).

Another optional feature found in one or more embodiments of inject clips as described herein include fill vents 44 provided in the base 40 of the inject clip 30. In particular fill vents 44 open into the base cavity 43 defined by the base 40 as described herein. The fill vents 44 provide an exit path out of the base cavity 43 for a flowable sealant delivered into the base cavity 43 through, e.g., injection port 58 in injection chamber 50. In one or more embodiments, it may be desirable to position fill vents at locations that are distant from the injection port 59 such that any flowable sealant introduced into the chamber cavity 57 of injection chamber 50 must pass through a significant portion of the base cavity 43 formed in base 40 before reaching the fill vents.

Although the depicted embodiment of inject clip 30 includes a pair of fill vents 44, one or more alternative embodiments of inject clips as described herein may include only one fill vent or three or more fill vents. In addition to the numbers of fill vents, the fill vents provided in inject clips as described herein may take many different forms, for example, the fill vents may, in one or more alternative embodiments, be provided by a gaps or openings in the walls 47 of base 40.

Another optional feature that may be found in one or more embodiments of an inject clip and a junction between an intermediate jamb and frame member as described herein can be described with respect to the illustrative embodiment of inject clip 30 and intermediate jamb 24. In particular, intermediate jamb 24 includes a clip cavity 28 extending into the jamb surface 25 as depicted in, for example, FIGS. 4-5. The depicted illustrative embodiment of inject clip 30 includes a clip retainer 60 extending away from the base cavity 43, with the clip retainer 60 terminating along an edge 62 distal from the base cavity 43 defined by the base 40 of inject clip 30.

When in position on the jamb surface 25 of intermediate jamb 24, the clip retainer 60 extends into the clip cavity 28 in jamb surface 25 of intermediate jamb 24. Extension of the clip retainer 60 into the clip cavity 28 may, in one or more embodiments, provide a mechanical interlock between the clip retainer 60 and the clip cavity 28 to limit movement of the inject clip 30 in a direction transverse to the intermediate jamb axis 21. Depending on the relative sizes of the clip retainer 60 and the clip cavity 28, the mechanical interlock between the clip retainer 60 and the clip cavity 28 may prevent movement of the inject clip 30 in a direction transverse to the intermediate jamb axis 21.

The clip cavity 28 may extend along the entire length of the intermediate jamb 24 or along only a portion of the length of the intermediate jamb 24. Similarly, the clip retainer 60 extending from the inject clip 30 may be shorter or longer than depicted in connection with the illustrative embodiment of inject clip 30. Furthermore, although only a single clip retainer 60 is depicted in connection with inject clip 30, one or more alternative embodiments may include two or more separate and discrete clip retainers extending from the inject clip 30.

In one or more alternative embodiments, the intermediate jamb 24 may be described as including a channel 28 extending into the jamb surface 25 of the intermediate jamb 24, while the inject clip 30 may be described as including a rib 60 extending away from the base cavity 43 of the base 40. The rib 60 may extend into the channel 28 such that the rib 60 and channel 28 mechanically interlock with each other to limit or prevent movement of the inject clip 30 in a direction transverse to the intermediate jamb axis 21. The channel 28 may extend along the entire length of the intermediate jamb 24 or along only a portion of the length of the intermediate jamb 24. Similarly, the length of the rib 60 extending from the inject clip 30 may be shorter or longer than depicted in connection with the illustrative embodiment of inject clip 30. Furthermore, although only a single rib 60 is depicted in connection with inject clip 30, one or more alternative embodiments may include two or more separate and discrete ribs extending from the inject clip 30.

Limiting or preventing movement of the inject clip 30 in a direction transverse to the intermediate jamb axis 21 may, in one or more embodiments, enhance delivery of flowable sealant into any gap found at the junction between the frame member 22 and intermediate jamb 24. If, as depicted in connection with the illustrative embodiment of inject clip 30 and frame member 22, control over movement of the inject clip in a direction transverse to the intermediate jamb axis 21 is coupled with an inject clip that includes a slot 52 configured to interlock with a portion of the frame member 22 to limit or prevent movement of the inject clip 30 in a direction along the intermediate jamb axis 21, delivery of flowable sealant into any gap found at the junction between the frame member 22 and intermediate jamb 24 may be even further enhanced. Enhancement of the delivery of flowable sealant into any gap found at the junction between the frame member 22 and intermediate jamb 24 may be caused by improving the pressure developed within the chamber cavity and/or base cavity by the flowable sealant during delivery of the flowable sealant into the chamber cavity and/or base cavity.

Figure 11:
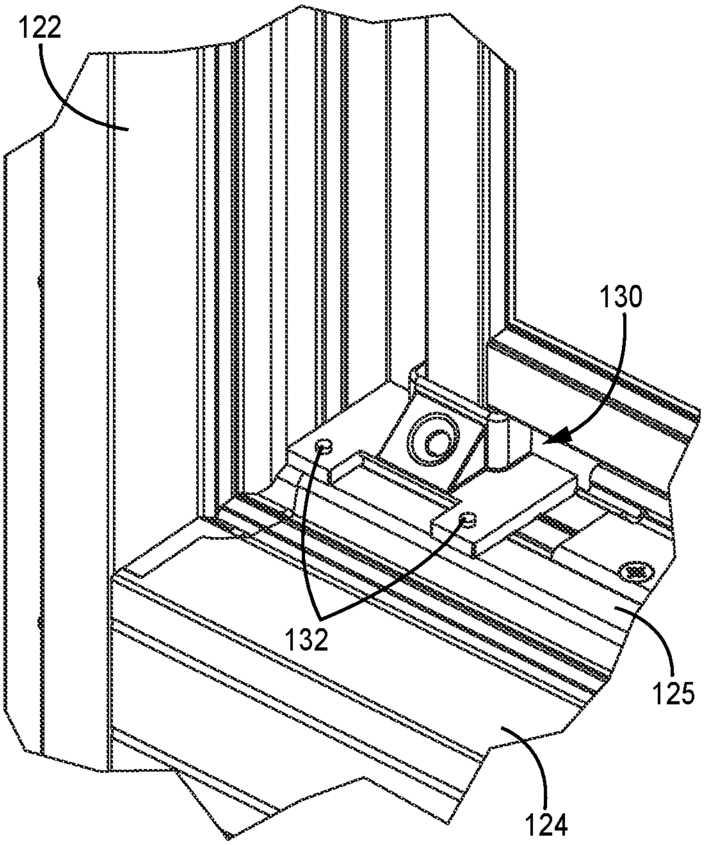
FIG. 11 is an enlarged view of another junction between an intermediate jamb and a frame member of a fenestration unit frame.

In place of, or in addition to, mechanically interlocking features and/or interference fit on the inject clip, intermediate jamb, and/or frame member provided to limit movement of the inject clip relative to the junction between an intermediate jamb and a frame member as described herein, one or more mechanical fasteners may be used to fix the position of an inject clip relative to the junction between an intermediate jamb and frame member. One illustrative embodiment of an inject clip 130 in position on the jamb surface 125 of an intermediate jamb 124 at the junction between the intermediate jamb 124 and a frame member 122 is depicted in FIG. 11. The inject clip 130 is secured or fixed in position by, in the depicted embodiment, a pair of mechanical fasteners 132, although only one mechanical fastener may be required to fix the position of the inject clip 130 on the intermediate jamb 124. The mechanical fasteners 132 may be in the form of, e.g., screws, nails, rivets, etc. Further, although depicted as affixed to the intermediate jamb 124, in one or more alternative embodiments in inject clip may be secured to the frame member 122 rather than the intermediate jamb.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the fenestration unit frames with inject clips and methods of using the same are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A fenestration unit frame comprising:

a plurality of frame members attached to each other to define a perimeter of a fenestration unit frame;

an intermediate jamb extending between a pair of frame members on opposite sides of the fenestration unit frame, the intermediate jamb extending from a first end to a second end, wherein the first end abuts a first frame member of the pair of frame members at a first junction located at an intermediate location along a length of the first frame member and the second end abuts a second frame member of the pair of frame members at a second junction located at an intermediate location along a length of the second frame member; and an inject clip proximate the first junction, the inject clip comprising:

a base configured for placement on a jamb surface of the intermediate jamb adjacent the first frame member, wherein the base defines a base cavity located between the jamb surface and the base; and an injection chamber attached to the base, the injection chamber extending away from the base towards an end of the first frame member, the injection chamber comprising only one injection port configured to receive flowable sealant into a chamber cavity of the injection chamber, wherein the chamber cavity is in fluid communication with the base cavity when the base of the inject clip is positioned on the jamb surface such that flowable sealant delivered to the chamber cavity through the injection port flows into the base cavity;

wherein the injection chamber defines a slot containing at least a portion of the first frame member, wherein the slot and the portion of the first frame member mechanically interlock with each other to limit movement of the inject clip in a direction aligned with an intermediate jamb axis extending through the first end and the second end of the intermediate jamb;

wherein the injection port is aligned with the slot such that flowable sealant delivered to the chamber cavity through the injection port flows into a junction between the first frame member and the intermediate jamb;

wherein the inject clip comprises a first fill vent opening into the base cavity and a second fill vent opening into the base cavity, wherein the injection port is located between the first fill vent and the second fill vent when moving along the intermediate jamb axis, wherein the first fill vent is configured to provide an exit path out of the base cavity for a flowable sealant delivered into the base cavity on a first side of the slot through the injection port and the chamber cavity, and wherein the second fill vent is configured to provide an exit path out of the base cavity on a second side of the slot for a flowable sealant delivered into the base cavity on a second side of the slot through the injection port and the chamber cavity;

and wherein the injection port is centered within the slot when moving along the intermediate jamb axis and the slot and the injection port are both centered between the first fill vent and the second fill vent when moving along the intermediate jamb axis.

2. A fenestration unit frame according to claim 1, wherein the intermediate jamb comprises a clip cavity extending into the jamb surface and wherein the inject clip comprises a clip retainer extending away from the base cavity into the clip cavity, wherein the clip cavity and the clip retainer mechanically interlock with each other to limit movement of the inject clip in a direction transverse to an intermediate jamb axis extending through the first end and the second end of the intermediate jamb.

3. A fenestration unit frame according to claim 1, wherein the intermediate jamb comprises a channel extending into the jamb surface and wherein the inject clip comprises a rib extending away from the base cavity into the channel, wherein the channel and the rib mechanically interlock with each other to limit movement of the inject clip in a direction transverse to an intermediate jamb axis extending through the first end and the second end of the intermediate jamb.

4. A fenestration unit frame according to claim 1, wherein the portion of the first frame member and the slot form and interference fit configured to maintain a position of the inject clip along a length of the first frame member.

5. A fenestration unit frame according to claim 1, wherein the injection port is located in a face of the injection chamber that is angled with respect to a top surface of the base such that a delivery axis extending through the injection port extends into a junction between the frame member and the intermediate jamb.

6. A fenestration unit frame according to claim 1, wherein the injection port is centered with respect to the slot and the portion of the frame member contained in the slot.

7. A fenestration unit frame according to claim 1, wherein the injection port is located in a face of the injection chamber that is angled with respect to a top surface of the base such that a delivery axis extending through the injection port extends into a junction between the frame member and the intermediate jamb;

and wherein the injection port is centered with respect to the slot and the portion of the frame member contained in the slot.

8. A fenestration unit frame according to claim 1, wherein the injection port is centered with respect to the slot and the portion of the frame member contained in the slot.

9. A method of sealing a junction in a fenestration unit frame, the method comprising:

placing an inject clip proximate a junction between a frame member and an intermediate jamb in a fenestration unit frame, wherein the intermediate jamb extends along an intermediate jamb axis between a pair of frame members on opposite sides of the fenestration unit frame, the intermediate jamb extending from a first end to a second end, wherein the inject clip comprises:

a base configured for placement on a jamb surface of the intermediate jamb adjacent a first frame member of the pair of frame members, wherein the base defines a base cavity located between the jamb surface and the base, an injection chamber attached to the base, the injection chamber extending away from the base towards an end of the first frame member, the injection chamber comprising only one injection port configured to receive flowable sealant into a chamber cavity of the injection chamber, wherein the chamber cavity is in fluid communication with the base cavity when the base of the inject clip is positioned on the jamb surface such that the flowable sealant delivered to the chamber cavity through the injection port flows into the base cavity, wherein the injection chamber defines a slot, wherein the injection port is aligned with the slot, wherein at least a portion of the first frame member is located in the slot, and wherein the injection port is aligned with the slot such that flowable sealant delivered to the chamber cavity through the injection port flows into the junction between the first frame member and the intermediate jamb, wherein the base chamber comprises a first fill vent opening into the base cavity and a second fill vent opening into the base cavity, wherein the injection port is located between first fill vent and the second fill vent when moving along the intermediate jamb axis, and wherein the injection port is centered within the slot when moving along the intermediate jamb axis and the slot and the injection port are both centered between the first fill vent and the second fill vent when moving along the intermediate jamb axis; and injecting flowable sealant into the chamber cavity of the inject clip through the injection port, wherein the flowable sealant flows into the junction between the first frame member and the intermediate jamb and from the chamber cavity into the base cavity wherein the first fill vent provides an exit path out of the base cavity for air in the base cavity and for the flowable sealant delivered into the base cavity on a first side of the slot, and wherein the second fill vent provides an exit path out of the base cavity on a second side of the slot for air in the base cavity and for the flowable sealant delivered into the base cavity on a second side of the slot.

10. A method according to claim 9, wherein placing the inject clip proximate the junction between the frame member and the intermediate jamb comprises fixing a position of the inject clip on a frame surface of the intermediate jamb.

11. A method according to claim 10, wherein fixing the position of the inject clip comprises limiting movement of the inject clip in a direction transverse to the intermediate jamb axis.

12. A method according to claim 10, wherein fixing the position of the inject clip comprises inserting a clip retainer on the inject clip into a clip cavity extending into the jamb surface.

13. A method according to claim 10, wherein fixing the position of the inject clip comprises inserting a rib on the inject clip into a channel extending into the jamb surface.

14. A method according to claim 10, wherein fixing the position of the inject clip comprises positioning a portion of the first frame member into a slot formed in the injection chamber of the inject clip, wherein the slot and the portion of the first frame member limit movement of the inject clip in a direction aligned with the intermediate jamb axis.

15. A method according to claim 10, wherein fixing the position of the inject clip comprises inserting a mechanical fastener through the inject clip and into one or both of the intermediate jamb and the first frame member.

16. A fenestration unit frame comprising:

a plurality of frame members attached to each other to define a perimeter of a fenestration unit frame;

an intermediate jamb extending between a pair of frame members on opposite sides of the fenestration unit frame, the intermediate jamb extending from a first end to a second end, wherein the first end abuts a first frame member of the pair of frame members at a first junction located at an intermediate location along a length of the first frame member and the second end abuts a second frame member of the pair of frame members at a second junction located at an intermediate location along a length of the second frame member; and an inject clip proximate the first junction, the inject clip comprising:

a base configured for placement on a jamb surface of the intermediate jamb adjacent the first frame member, wherein the base defines a base cavity located between the jamb surface and the base;

an injection chamber attached to the base, the injection chamber extending away from the base towards an end of the first frame member, the injection chamber comprising only one injection port configured to receive flowable sealant into a chamber cavity of the injection chamber, wherein the chamber cavity is in fluid communication with the base cavity when the base of the inject clip is positioned on the jamb surface such that flowable sealant delivered to the chamber cavity through the injection port flows into the base cavity;

wherein the injection chamber defines a slot containing at least a portion of the first frame member, wherein the slot and the portion of the first frame member mechanically interlock with each other to limit movement of the inject clip in a direction aligned with an intermediate jamb axis extending through the first end and the second end of the intermediate jamb;

wherein the injection port is aligned with the slot and wherein the injection port is located in a face of the injection chamber that is angled with respect to a top surface of the base such that a delivery axis extending through the injection port extends into a junction between the frame member and the intermediate jamb such that flowable sealant delivered to the chamber cavity through the injection port along a delivery axis extending through the injection port flows into a junction between the first frame member and the intermediate jamb;

wherein the inject clip comprises a first fill vent opening into the base cavity and a second fill vent opening into the base cavity, wherein the injection port is located between first fill vent and the second fill vent when moving along the intermediate jamb axis, wherein the first fill vent is configured to provide an exit path out of the base cavity for a flowable sealant delivered into the base cavity on a first side of the slot through the injection port and the chamber cavity, and wherein the second fill vent is configured to provide an exit path out of the base cavity on a second side of the slot for a flowable sealant delivered into the base cavity on a second side of the slot through the injection port and the chamber cavity;

and wherein the injection port is centered within the slot when moving along the intermediate jamb axis and the slot and the injection port are both centered between the first fill vent and the second fill vent when moving along the intermediate jamb axis;

wherein the intermediate jamb comprises a clip cavity extending into the jamb surface and wherein the inject clip comprises a clip retainer extending away from the base cavity into the clip cavity, wherein the clip cavity and the clip retainer mechanically interlock with each other to limit movement of the inject clip in a direction transverse to an intermediate jamb axis extending through the first end and the second end of the intermediate jamb;

and wherein the portion of the first frame member and the slot form and interference fit configured to maintain a position of the inject clip along a length of the first frame member.

* * * * *